United States Patent [19]

Goodall et al.

[11] Patent Number: 4,478,989

[45] Date of Patent: Oct. 23, 1984

[54] PROCESS FOR THE STEREOSPECIFIC POLYMERIZATION OF AN ALPHA OLEFIN AND AN ALPHA OLEFIN POLYMERIZATION CATALYST SYSTEM

[75] Inventors: Brian L. Goodall, Houston, Tex.; Wilhelmina J. M. van der Linden-Lemmers, Amsterdam, Netherlands

[73] Assignee: Shell Oil Company, Houston, Tex.

[21] Appl. No.: 545,574

[22] Filed: Oct. 26, 1983

Related U.S. Application Data

[63] Continuation-in-part of Ser. No. 348,400, Feb. 12, 1982, abandoned, which is a continuation of Ser. No. 158,082, Jun. 10, 1980, abandoned.

[30] Foreign Application Priority Data

Jun. 11, 1979 [GB] United Kingdom ................. 7920181

[51] Int. Cl.$^3$ .......................... C08F 4/64; C08F 10/06
[52] U.S. Cl. .................................... 526/142; 502/125; 526/153; 526/351
[58] Field of Search ................. 526/142, 153; 502/125

[56] References Cited

U.S. PATENT DOCUMENTS

| | | | |
|---|---|---|---|
| 3,445,443 | 5/1969 | Sasaki et al. | 526/153 |
| 4,064,334 | 12/1977 | Kuroda et al. | 526/125 |
| 4,069,169 | 1/1978 | Toyoda et al. | 526/125 |
| 4,107,416 | 8/1978 | Giannini et al. | 526/125 |
| 4,202,953 | 5/1980 | Matsuura et al. | 526/125 |

FOREIGN PATENT DOCUMENTS

| | | | |
|---|---|---|---|
| 21478 | 1/1981 | European Pat. Off. | 526/142 |
| 1278516 | 6/1972 | United Kingdom . | |

*Primary Examiner*—Edward J. Smith
*Attorney, Agent, or Firm*—Dean F. Vance

[57] ABSTRACT

A process for the stereospecific polymerization of an alpha olefin with at least three carbon atoms, with a catalyst system comprising (a) a titanium halide, and (b,i) a reaction product of an organoaluminum halide and an aromatic compound or (b,ii) a reaction product of an organoaluminum halide, an aromatic compound and a halogen-free organoaluminum compound, the aromatic compound being a hydroxy aromatic compound which comprises a sec. or tert. alkyl group in both ortho-positions in respect of the hydroxyl group.

8 Claims, No Drawings

PROCESS FOR THE STEREOSPECIFIC POLYMERIZATION OF AN ALPHA OLEFIN AND AN ALPHA OLEFIN POLYMERIZATION CATALYST SYSTEM

This is a continuation-in-part of application Ser. No. 348,400, filed Feb. 12, 1982, now abandoned which is a continuation of application Ser. No. 158,082, filed June 10, 1980, now abandoned.

The present invention relates to a process for the stereospecific polymerization of an alpha olefin with at least three carbon atoms with a catalyst system comprising a titanium halide and to the catalyst system per se.

It is well known that catalyst systems for the stereospecific polymerization of an alpha olefin, which comprise a titanium halide component and an organoaluminum component can be modified in order to increase their polymerization activity and stereospecific performance, by reacting the organoaluminum compound with an electron donor (Lewis base). Numerous electron donors have already been proposed, such as ethyl benzoate, p-methoxy ethyl benzoate, triethyl amine, dimethyl terephthalate, methyl methacrylate, pyridine, piperidine and tetramethyl ethylene diamine. Other electron donors which have been disclosed in Netherlands patent application No. 7709699 are propyl-phenol, cresol and naphtol.

U.S. Pat. No. 4,107,416 is concerned with organoaluminum components for alpha olefin polymerization catalyst systems comprising a halogen-free organoaluminum compound with the general formula $R_2Al(OR')$ or $RAl(OR')_2$ in which R is an alkyl group and R' is a 2,6-di-sec. or tert-alkyl substituted phenyl group or a 2,8-di-sec. or tert.alkyl substituted naphtyl group. These catalyst components may be prepared by reacting a trialkyl aluminum compound with an appropriate sterically hindered phenol or naphtol. Those proposed catalyst components are only of interest for supported titanium tetrahalide catalyst systems comprising a particulate magnesium dihalide; with conventional titanium trihalide catalyst systems an insufficient stereospecific performance is obtained, as will be shown in the comparative Example included herein (Example 10).

In accordance with the present invention an outstanding stereospecific performance and an excellent polymerization activity are obtained when employing catalyst systems comprising organo aluminum halide catalyst components that have been modified by reacting with a sterically hindered hydroxy aromatic compound.

SUMMARY OF THE INVENTION

Thus, the present invention is concerned with a process for the stereospecific polymerization of an alpha olefin with at least three carbon atoms, with a catalyst system comprising (a) a titanium halide, and (b,i) a reaction product of an organoaluminum halide and an aromatic compound or (b,ii) a reaction product of an organoaluminum halide, an aromatic compound and a halogen-free organoaluminum compound, the aromatic compound being a hydroxy aromatic compound which comprises a sec. or tert.alkyl group in both ortho-positions in respect of the hydroxyl group.

In particular, the present invention is concerned with an olefin polymerization catalyst system comprising a solid component (a) and a separate and independent cocatalyst (b,i) or (b,ii) wherein component (a) is a catalytically active titanium trihalide; component (b,i) is a reaction product of at least one organoaluminum halide and at least one aromatic compound, and component (b,ii) is a reaction product of at least one organoaluminum halide, at least one aromatic compound and at least one halogen-free organoaluminum compound, wherein:

(1) the aromatic compound is a hydroxyaromatic compound which comprises a secondary or tertiary alkyl group in both ortho-positions in respect of the hydroxyl group and contains no olefinic double bonds;

(2) the organoaluminum halide is an alkylaluminum mono- or dihalide;

(3) the halogen-free organoaluminum compound is an alkyl aluminum compound;

(4) the molar ratio of aluminum to aromatic compound in the preparation of component (b,i) or (b,ii) is in the range from 0.5:1 to 3:1;

(5) said reaction products (b,i) and (b,ii) contain at least one carbon-aluminum bond; and (6) the ratio of component (b,i) or (b,ii) to component (a) is in the range from 0.1:1 to 12:1.

DETAILED DESCRIPTION OF THE INVENTION

Preferred hydroxy aromatic compounds are 2,6-di-tert.alkyl hydroxy benzenes, in which one or more of the ring carbon atoms may carry substituents other than hydrogen atoms. Good representatives of these groups of compounds are 2,6-di-tert.butyl-hydroxy benzene, 2,6-di-tert.butyl-4-methyl-hydroxy benzene, 2,6-di-tert.decyl-4-methoxy-hydroxy benzene, 2,6-di-tert.butyl-4-isopropyl hydroxy benzene, tri-(2,6-di-tert.hexyl-hydroxy-phenyl) benzene, 1,3,5 tris-(2,6-di-tert.butyl-hydroxy-phenyl)-2,4,6-trimethyl benzene, 2,2-di-(2,6-di-tert.butyl-hydroxy-phenyl)propane, di-(2,6-di-tert.butyl-hydroxy-phenyl)methane and 2,6-di-tert.amyl-4-n-butyl-hydroxy benzene.

Other examples of suitable hydroxy aromatic compounds are 1,3-di-tert.butyl-2-hydroxy anthracene, 1,3-di-tert.hexyl-2-hydroxy phenanthrene 1,3,6,8-tetra-tert.butyl-2,7-dihydroxy phenanthrene, 2,8-di-tert.butyl-hydroxy naphthalene, 1,3-di-tert.hexyl-2-hydroxy naphtalene, 2,6-dicyclohexyl-4-methyl-hydroxy benzene, 2,6-di-isopropyl-4-methoxy-hydroxy benzene and, 1,3-di-isoamyl-2-hydroxy naphtalene, 2,6-di-t-butyl-4-sec-butylphenol, 4,4'-methylenebis(2,6-di-t-butyl-phenol), and 2,6-ditertiary butyl-1-hydroxy-anisole.

None of these aromatic compounds contain olefinic double bonds; they are not adapted to be incorporated into the polymer molecules.

Suitable organoaluminum halides which can be used for the preparation of catalyst components (b,i) or (b,ii) are selected from alkyl, aryl, alkoxy, aryloxy aluminum mono and dihalides, particularly those in which the alkyl or alkoxy groups have from 2 to 8 carbon atoms. Good representatives of this class of compounds are diethyl aluminum chloride, di-isopropyl aluminum chloride, di-isobutyl aluminum bromide, di-n-hexyl aluminum iodide, dicyclohexyl aluminum chloride, n-propyl aluminum dibromide, isopropyl aluminum di-iodide, iso-amyl aluminum dichloride, n-octyl aluminum dichloride, diphenyl aluminum chloride, naphtyl aluminum dibromide, ethoxy aluminum dichloride, methoxy aluminum dibromide, isobutoxy aluminum dichloride, phenoxy aluminum di-iodide and di-naphtenoxy aluminum chloride. The most preferred compounds are alkyl aluminum dihalides and dialkyl aluminum halides, particularly chlorides.

The halogen-free organoaluminum compounds that can be used for the preparation of catalyst component (b,ii) are suitably selected from alkyl, alkoxy, aryl and aryloxy aluminum compounds, the alkyl and alkoxy groups preferably having from 2 to 8 carbon atoms. Examples of this class of compounds are triethyl aluminum, triisobutyl aluminum, diethylphenyl aluminum, diisopropyl-hexyl aluminum, dicyclo-hexyl aluminum iso-propoxide, n-hexyl aluminum dihexanoxide, triphenyl aluminum, ethyl-dinaphtyl aluminum, di-n-butyl aluminum phenoxide and 4-isopropylphenyl aluminum n-butoxide. Particularly preferred compounds are trialkyl aluminum compounds.

In the preparation of component (b,ii) the three reactants may be combined in any order. Thus the invention includes first preparing a reaction product of the organoaluminum halide and the aromatic compound and then reacting this product with the halogen free organoaluminum compound, but also reacting the aromatic compound with a mixture of organoaluminum halide and halogen free organoaluminum compound, as well as first reacting the aromatic compound with the halogen free organoaluminum compound and then reacting the resulting product with the organoaluminum halide. Any and all of these reactions and also, the reaction to prepare catalyst component (b,i) may be effected in the presence of catalyst component (a). It is however preferred to prepare the final catalyst system by combining component (a) with components (b,i) or (b,ii) which have been prepared in a separate previous operation.

Preferred molar ratios for reacting the hydroxy aromatic compound with the organoaluminum compound or compounds are selected from the range of from 0.5:1 to 3:1 but smaller or larger ratios may be used as well. When two different organoaluminum compounds are employed, as will be the case for the preparation of component (b,ii), the ratio refers to the total amount of organoaluminum compounds used. No critical temperature exists for the desired reaction, hence, the reaction may be effected at room temperature or at an elevated temperature of, for example, 95° C., and in the presence or absence of an inert organic diluent.

The modified catalyst components of this invention generally correspond with the general formula $R_p(Al(OR')_qX_r$ in which R represents the same hydrocarbyl group as contained in the organoaluminum starting material, OR' represents an aryloxy group derived from a hydroxy aromatic compound comprising a sec. or tert.alkyl group in both orthopositions in respect of the hydroxyl group, X represents a halogen atom and in which p is at least 1, preferably at most 2.0, q is at least 0.3, preferably at least 0.9 and r is at least 0.3, preferably at least 0.9 the sum of p, q and r being equal to 3.0.

In the process of this invention catalyst component (a) is a catalytically active titanium trihalide. The halide may be bromide or iodide, but particular preference is given to chloride. Component (a) may also be modified by reacting with an electron donor.

The atomic ratio of aluminum to titanium employed for combining the catalyst components is usually varied in the range of from 0.1 to 12:1, preferably from 1.0 to 9:1.

The novel catalyst system of this invention may be employed for homo- and copolymerization of alpha olefins, such as 1-pentene, 1-butene, 1-octene, preferably propylene. In copolymerization the second monomer is not limited to olefins with three carbon atoms; thus copolymerization of propylene with ethylene is included as well in the process of this invention.

The polymerization can be effected in accordance with any of the conventional methods, such as slurry polymerization in a liquid monomer or in an inert hydrocarbon diluent, and gas phase polymerization. Hydrogen may be used to control molecular weight. Continuous or batch-wise polymerization is possible. The polymerization pressure will usually be in the range from 98 to 5000 kPa and the temperature will usually be chosen in between 0° C. and 110° C., preferably in between 20° and 85° C.

EXAMPLES

EXAMPLE 1 a Preparation of titanium trichloride

A solution comprising 3 mol $TiCl_4$ and 1.5 mol diisoamylether in 0.75 l toluene was gradually added dropwise during one hour at 20° C. to a stirred solution comprising 1 mol triethyl aluminum, 1 mol diisoamylether and 2 l toluene. When the addition was completed the temperature of the resulting reaction mixture was raised to 90° C. during 150 minutes and kept at that temperature for two hours. The active particulate $TiCl_3$ so obtained was isolated from the liqid reaction medium by decantation and washed six times with toluene and one time with isooctane.

b Preparation of activating component 4 mmol triethyl aluminum and 4 mmol of 2,6-di-tert.butyl-hydroxy benzene were mixed at a temperature of 60° C. in the presence of 8 ml isooctane. The resulting mixture was then introduced at room temperature into a 3 l glass polymerization reactor containing 1400 ml isooctane and 4 mmol of ethyl aluminum dichloride. The resulting reaction mixture is referred to herein as Activator A.

c Polymerization 15 minutes after the addition of the reaction mixture into the polymerization reactor, 1.5 mmol of active $TiCl_3$ suspended in 100 ml isooctane was introduced into the reactor. Then, the reactor was pressurized with propylene and the contents were rapidly heated to 70° C. At that temperature the pressure was 260 kPa and the polymerization was continued for three hours. The reaction was stopped by deactivating the catalyst with butanol and the polymer was washed with a mixture of aqueous HCl and ethyl alcohol and three times with water. After steam distillation the polymer was filtered off and dried.

The polymerization activity of the catalyst system is calculated as gram polymer per gram $TiCl_3$ per 98 kPa per hour. The stereospecific performance of the catalyst system is expressed as the percentage of polymeric material that remains soluble when cooling a solution of polymer in xylene from its boiling point to room temperature.

EXAMPLE 2

Example 1 is repeated now using 2,6-di-tert.butyl-4-methyl-hydroxy benzene instead of 2,6-di-tert.butyl-hydroxy benzene, but leaving all other conditions unchanged (Activator B).

EXAMPLE 3

8 mmol of diethyl aluminum chloride was reacted with 4 mmol of 2,6-di-tert.butyl-hydroxy benzene at 60° C. for one hour in the presence of 10 ml isooctane. The resulting reaction mixture (Activator C) was introduced into a reactor containing 1400 ml isooctane. Thereafter the procedure of Example 1 c was followed.

EXAMPLE 4

8 mmol of diethyl aluminum chloride was reacted with 4 mmol of 2,6-di-tert.butyl-hydroxy benzene at 60° C. for one hour in the presence of 10 ml isooctane. The resulting reaction mixture (Activator D) was introduced into a reactor containing 1400 ml isooctane and 1 mmol triethyl aluminum. Thereafter the procedure of Example 1 c was followed.

EXAMPLE 5

8 mmol of diethyl aluminum chloride was reacted with 4 mmol of 2,6-di-tert.butyl-4-methyl-hydroxy benzene at 60° C. in the presence of 10 ml isooctane. The resulting reaction mixture (Activator E) was introduced into a reactor containing 1400 ml isooctane. Thereafter the procedure of Example 1 c was followed.

EXAMPLE 6

4 mmol tri-isobutyl aluminum and 4 mmol of 2,6-di-tert.butyl-4-methyl-hydroxy benzene was mixed at 60° C. in the presence of 10 ml isooctane. The resulting reaction mixture (Activator F) was then introduced into a reactor containing 1400 ml isooctane and 4 mmol ethyl aluminum dichloride and the polymerization procedure of Example 1 c was followed.

EXAMPLE 7

A mixture of 4 mmol triethyl aluminum and 4 mmol ethyl aluminum dichloride was introduced into a polymerization reactor containing 1400 ml isooctane. Then at 60° C., 4 mmol of 2,6-di-tert.butyl-4-methyl-hydroxy benzene was introduced into the reactor (Activator G). Thereafter the procedure of Example 1 c was followed.

EXAMPLE 8

(for comparison)

A mixture of 8 mmol ethyl aluminum dichloride (Activator a) and 8 ml isooctane was introduced into a reactor comprising 1400 ml isooctane. Thereafter the procedure of Example 1 c was followed.

EXAMPLE 9

(for comparison)

Example 8 was repeated at the same conditions apart from employing 9 mmol of diethyl aluminum chloride (Activator b) instead of 8 mmol ethyl aluminum dichloride.

EXAMPLE 10

(for comparison)

In order to compare the modified activators of this invention with those known from German U.S. Pat. No. 4,107,416, Example 1 was repeated omitting the presence of ethyl aluminum dichloride in the reactor when introducing the reaction product of the hindered phenol and triethyl aluminum (Activator c). Then the procedure of Example 1 c was followed.

All polymerization results are included in the Table below.

TABLE

| Ex. | Activator | REACTANTS | | RESULTS | |
|---|---|---|---|---|---|
| | | Phenolic | Organo-Al | Activity | Solubles |
| 1 | A | DTBP | AlEt$_3$, EADC | 198 | 2.4 |
| 2 | B | IONOL | AlEt$_3$, EADC | 178 | 2.3 |
| 3 | C | DTBP | DEAC | 144 | 1.8 |
| 4 | D | DTBP | DEAC, AlEt$_3$ | 191 | 3.3 |
| 5 | E | IONOL | DEAC | 163 | 2.4 |
| 6 | F | DTBP | AliBu$_3$, EADC | 206 | 1.3 |
| 7 | G | IONOL | AlEt$_3$, EADC | 191 | 2.8 |
| 8* | a | — | EADC | 0.1 | — |
| 9* | b | — | DEAC | 141 | 8.0 |
| 10* | c | DTBP | AlEt$_3$ | 190 | 30 |

*for comparison
AliBu$_3$ = triisobutyl alumiun
AlEt$_3$ = triethyl aluminum
DEAC = diethyl aluminum chloride
EADC = ethyl aluminum dichloride
DTBP = 2,6-di-tert.butyl-hydroxy benzene
IONOL = 2,6-di-tert.butyl-4-methyl-hydroxy benzene.

While the Applicants do not wish that the present invention be restricted in any respect by theoretical considerations it is believed that the difference between the beneficial effects obtained with the reaction products of halogen containing organoaluminum compounds and the disappointing results which are obtained with reaction products of halogen-free organoaluminum compounds, as shown in comparative Example 10, can be explained as follows:

Activation of titanium halides to enhance the polymerization activity and stereospecific performance thereof, with alkyl aluminum phenoxy compounds proceeds via a reaction between the active sites on the surface of the titanium halide crystallites and the monomeric form of the activating organoaluminum compound. It is however known that such phenoxy compounds can easily form dimers or trimers by oligomerization, such oligomerization reactions reducing the beneficial effect of the interaction between the active sites on the crystallite surface and the activating species. Likewise, sterically hindered phenoxy compounds that have been proposed in the prior art are thermodynamically unstable. The latter instability brings about a decomposition of the monomeric species into less desirable organoaluminum compounds, such as trialkyl aluminum compounds.

Now, when using reaction products of sterically hindered phenols and halogen containing organoaluminum compounds instead of halogen-free aluminum alkyl compounds, it is assumed that the presence of the halogen atoms will favor the formation of the desired monomeric species via the presence of a halogen bridge or halogen bridges in associated structures of the type

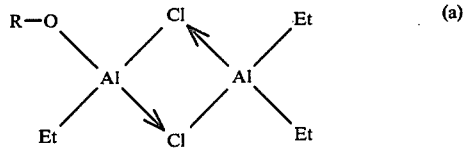

(a)

in which R indicates the 2,6-di-tert.butyl-phenyl group. Such "pseudo" monomeric structures are in equilibrium with the true monomeric structure RO—AlEtCl which can then easily react with the active sites on the titanium halide crystalline surface.

The bridged compounds of formula (a) can furthermore easily react with well known catalyst poisons, e.g., ethyl aluminum dichloride to form structures of the type

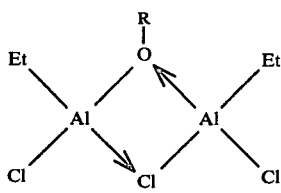

(b)

which are harmless complexes not acting as an inhibitor to reduce the polymerization activity of titanium halides.

What is claimed is:

1. An olefin polymerization catalyst system comprising a solid component (a) and a separate and independent cocatalyst (b,i) or (b,ii) wherein component (a) is a catalytically active titanium trihalide; component (b,i) is a reaction product of at least one organoaluminum halide and at least one aromatic compound, and component (b,ii) is a reaction product of at least one organoaluminum halide, at least one aromatic compound and at least one halogen-free organoaluminum compound, wherein (1) the aromatic compound is selected from the group consisting of 2,6-di-tert.butyl-hydroxy benzene, 2,6-di-tert.butyl-4-methyl-hydroxy benzene, 2,6-di-tert.decyl-4-methoxy-hydroxy benzene, 2,6-di-tert-.butyl-4-isopropyl hydroxy benzene, tri-(2,6-di-tert.hexyl-hydroxy-phenyl) benzene, 1,3,5 tris-(2,6di-tert.butyl-hydroxy-phenyl)-2,4,6-trimethyl benzene, 2,2-di-(2,6-di-tert.butyl-hydroxy-phenyl) propane, di-(2,6-di-tert.butyl-hydroxy-phenyl) methane, 2,6-di-tert.amyl-4-n-butyl-hydroxy benzene, 1,3-di-tert.butyl-2-hydroxy anthracene, 1,3-di-tert.hexyl-2-hydroxy phenanthrene, 1,3,6,8-tetra-tert.butyl-2,7-dihydroxy phenanthrene, 2,8-di-tert.butyl-hydroxy naphtalene, 1,3-di-tert.hexyl-2-hydroxy naphtalene, 2,6-dicyclohexyl-4-methyl-hydroxy benzene, 2,6-di-isopropyl-4-methoxy-hydroxy benzene, and 1,3-di-isoamyl-2-hydroxy naphtalene;

(2) the organoaluminum halide is an alkylaluminum mono- or dihalide;

(3) the halogen-free organoaluminum compound is an alkylaluminum compound;

(4) the molar ratio of aluminum to aromatic compound in the preparation of component (b,i) or (b,ii) is in the range from 0.5:1 to 3:1;

(5) said reaction products (b,i) and (b,ii) contain at least one carbon-aluminum bond; and (6) the ratio of component (b,i) or (b,ii) to component (a) is in the range from 0.1:1 to 12:1.

2. The olefin polymerization catalyst system of claim 1 wherein said organoaluminum halide is an alkyl aluminum monochloride or dichloride, said halogen-free organoaluminum compound is a trialkylaluminum, and said aromatic compound is a substituted hydroxybenzene having tertiary butyl groups in both ortho positions to the hydroxyl group.

3. The olefin polymerization catalyst system of claim 1 wherein said organoaluminum halide is diethylaluminum chloride or ethylaluminum dichloride or a mixture thereof, said halogen-free organoaluminum compound is triethylaluminum or tri-isobutylaluminum and said aromatic compound is 2,6-di-tert.butyl-hydroxybenzene or 2,6-di-tert.butyl-4-methyl-hydroxybenzene.

4. An olefin polymerization catalyst system comprising a solid component (a) and a separate and independent cocatalyst (b) wherein component (a) is a catalytically active titanium trichloride and component (b) is the reaction product of one molar part of triisobutyl aluminum and one molar part of 2,6-di-tert.butyl-4-methyl-hydroxy-benzene, further reacted with one molar part of ethylaluminum dichloride; wherein the ratio of component (b) to component (a) is in the range from 0.1:1 to 12:1.

5. The catalyst system of claim 1 wherein said aromatic compound is selected from the group consisting of 2,6-di-tert.butyl-hydroxy benzene, 2,6-di-tert.butyl-4-methyl-hydroxy benzene, 2,6-di-tert.decyl-4-methoxy-hydroxy benzene, 2,6-di-tert.butyl-4-isopropyl hydroxy benzene, tri-(2,6-di-tert.hexyl-hydroxy-phenyl) benzene, 1,3,5 tris-(2,6-di-tert.butyl-hydroxy-phenyl)-2,4,6-trimethyl benzene, 2,2-di-(2,6-di-tert.butyl-hydroxy-phenyl) propane, di-(2,6-di-tert.butyl-hydroxy-phenyl)methane and 2,6-di-tert.amyl-4-n-butyl-hydroxy benzene.

6. A process for the stereospecific polymerization of an alpha olefin of at least three carbon atoms which comprises contacting the olefin feed under polymerization conditions with a catalyst according to claim 1.

7. A process for the stereospecific polymerization of a propylene feed which comprises contacting the propylene feed under polymerization conditions with a catalyst according to claim 1.

8. A process for the polymerization of a propylene feed which comprises contacting the propylene feed under polymerization conditions with a catalyst according to claim 1, wherein said organoaluminum halide is diethylaluminum chloride or ethylaluminum dichloride or a mixture thereof, said halogen-free organoaluminum compound is triethylaluminum or tri-isobutylaluminum and said aromatic compound is 2,6-di-tert.butyl-hydroxybenzene or 2,6-di-tert.butyl-4-methyl-hydroxybenzene.

* * * * *